US010926648B2

(12) United States Patent
Weinzierl et al.

(10) Patent No.: US 10,926,648 B2
(45) Date of Patent: Feb. 23, 2021

(54) METHOD FOR OPERATING A MOTOR VEHICLE AND MOTOR VEHICLE

(71) Applicant: AUDI AG, Ingolstadt (DE)

(72) Inventors: Stefan Weinzierl, Kösching (DE); Matthias Geuß, Breitengüßbach (DE); Dominik Dreher, Ingolstadt (DE); Michael Ackermann, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 171 days.

(21) Appl. No.: 15/787,016

(22) Filed: Oct. 18, 2017

(65) Prior Publication Data
US 2018/0141446 A1 May 24, 2018

(30) Foreign Application Priority Data

Nov. 18, 2016 (DE) .......................... 102016222827.7

(51) Int. Cl.
*B60L 53/00* (2019.01)
*B60W 10/184* (2012.01)
(Continued)

(52) U.S. Cl.
CPC ................. *B60L 53/00* (2019.02); *B60L 7/10* (2013.01); *B60L 7/26* (2013.01); *B60L 11/1809* (2013.01);
(Continued)

(58) Field of Classification Search
CPC ...... B60L 11/1809; B60L 58/27; B60L 53/00; B60L 15/2045; B60L 7/26;
(Continued)

(56) References Cited

U.S. PATENT DOCUMENTS 6,209,672 B1 * 4/2001 Severinsky ............ B60K 6/442
180/65.23
6,408,968 B1 * 6/2002 Wakashiro ............. B60K 6/485
180/65.26
(Continued)

FOREIGN PATENT DOCUMENTS

CN 1371822 A 10/2002
DE 102010063358 A1 6/2012
(Continued)

OTHER PUBLICATIONS

Examination Report dated Jan. 12, 2017 of corresponding German application No. 102016222827.7; 5 pgs.
(Continued)

*Primary Examiner* — Peter D Nolan
*Assistant Examiner* — Ashley L Redhead, Jr.
(74) *Attorney, Agent, or Firm* — Maier & Maier, PLLC

(57) ABSTRACT

A method for operating a motor vehicle. At least one electric engine designed for driving the motor vehicle is used to recuperate electric energy. In this case, a travel of the motor vehicle during a period of time lying ahead is taken into account. During the use of at least one electric engine for recuperating the electric energy, it is taken into account whether during a thermal load of the at least one electric engine in the period lying ahead, a reduction of the power that can be output by at least one electric engine is to be expected. The at least one electric engine then recuperates an amount of electric energy during the deceleration of the motor vehicle which is smaller than the amount of electric energy that can be recuperated during the deceleration by the at least one electric engine. The invention relates in addition also to a motor vehicle.

10 Claims, 1 Drawing Sheet

(51) Int. Cl.

| | | |
|---|---|---|
| *B60W 50/08* | (2020.01) | |
| *B60L 7/26* | (2006.01) | |
| *B60W 10/08* | (2006.01) | |
| *B60W 30/18* | (2012.01) | |
| *B60L 15/20* | (2006.01) | |
| *B60W 30/184* | (2012.01) | |
| *B60L 58/27* | (2019.01) | |
| *B60L 53/56* | (2019.01) | |
| *B60L 7/10* | (2006.01) | |
| *B60L 11/18* | (2006.01) | |
| *B60W 30/182* | (2020.01) | |

(52) U.S. Cl.
CPC .......... *B60L 15/2045* (2013.01); *B60L 53/56* (2019.02); *B60L 58/27* (2019.02); *B60W 10/08* (2013.01); *B60W 10/184* (2013.01); *B60W 30/1843* (2013.01); *B60W 30/18127* (2013.01); *B60W 50/082* (2013.01); *B60L 2240/60* (2013.01); *B60L 2240/70* (2013.01); *B60L 2260/50* (2013.01); *B60W 30/182* (2013.01); *B60W 2510/087* (2013.01); *B60W 2540/00* (2013.01); *B60W 2540/30* (2013.01); *B60W 2552/00* (2020.02); *B60W 2552/20* (2020.02); *B60W 2556/50* (2020.02); *B60W 2710/08* (2013.01); *B60W 2710/083* (2013.01); *B60W 2710/246* (2013.01); *B60Y 2300/89* (2013.01); *Y02T 10/64* (2013.01); *Y02T 10/72* (2013.01); *Y02T 90/16* (2013.01)

(58) Field of Classification Search
CPC ............ B60L 2260/50; B60L 2240/70; B60L 2240/60; Y02T 10/72; Y02T 10/7291; Y02T 10/645; Y02T 10/7283; Y02T 90/161; Y02T 90/16; B60W 2710/246; B60W 30/182; B60W 2540/00; B60W 2550/14; B60W 2710/08
See application file for complete search history.

(56) References Cited

U.S. PATENT DOCUMENTS

| | | | | |
|---|---|---|---|---|
| 6,549,840 | B1* | 4/2003 | Mikami | B60K 17/354 |
| | | | | 701/69 |
| 8,996,218 | B2* | 3/2015 | Gehring | B60W 10/06 |
| | | | | 701/22 |
| 2008/0255716 | A1* | 10/2008 | Bandai | B60T 1/10 |
| | | | | 701/22 |
| 2014/0180517 | A1* | 6/2014 | Endo | B60W 20/14 |
| | | | | 701/22 |
| 2015/0180517 | A1* | 6/2015 | Abe | G08C 17/00 |
| | | | | 455/99 |
| 2015/0251653 | A1* | 9/2015 | Banker | B60W 10/196 |
| | | | | 477/4 |
| 2015/0298553 | A1* | 10/2015 | Maiterth | B60L 3/10 |
| | | | | 701/71 |
| 2016/0137184 | A1 | 5/2016 | Hokoi et al. | |
| 2016/0137185 | A1 | 5/2016 | Morisaki | |

FOREIGN PATENT DOCUMENTS

| | | |
|---|---|---|
| DE | 102013110346 A1 | 4/2014 |
| EP | 1 232 895 A2 | 8/2002 |
| EP | 3132966 A1 | 2/2017 |
| WO | 2015049572 A2 | 4/2015 |
| WO | 2015059536 A1 | 4/2015 |

OTHER PUBLICATIONS

European Search Report dated Mar. 12, 2018 of corresponding European application No. 17184666.0; 6 pgs.

Office Action dated Jun. 29, 2020 in corresponding Chinese Application No. 201710961713.8; 13 pages including English-language translation.

Examination Report dated Dec. 10, 2020 in corresponding European Application No. 17 184 666.0; 8 pages including partial machine-generated English-language translation.

\* cited by examiner

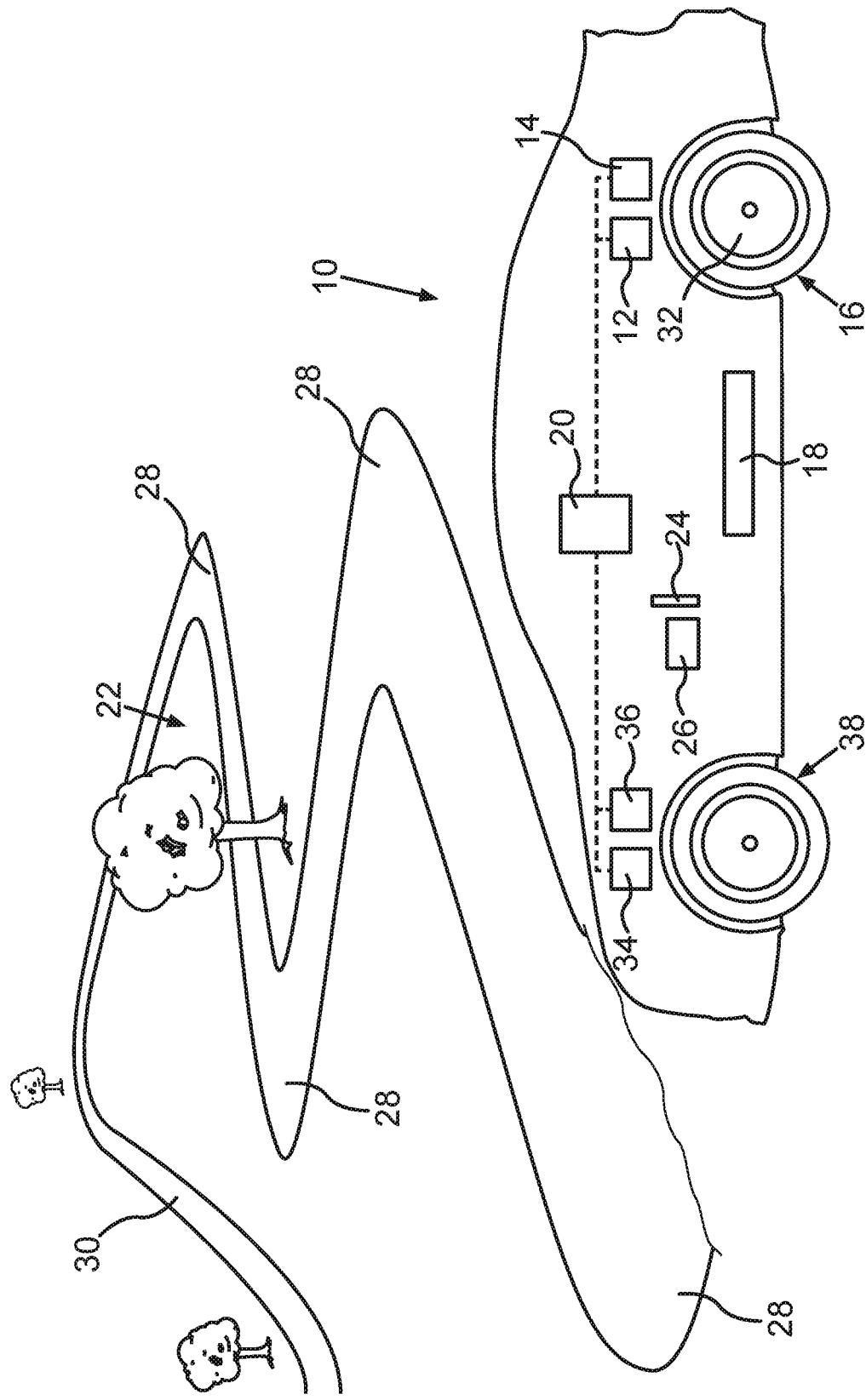

METHOD FOR OPERATING A MOTOR VEHICLE AND MOTOR VEHICLE

FIELD OF THE INVENTION

The invention relates to a method to operate a motor vehicle, wherein at least one electric engine is used for recuperation of the generated electric energy for driving the motor vehicle. A trip of the motor vehicle during the time period lying ahead is taken into account in this case. In addition, the invention relates to a motor vehicle that is designed to carry out the method of this invention.

BACKGROUND

Document DE 10 2010 063 358 A1 describes a method for determining a power reserve of an electric drive of a motor vehicle. In this case, the power limit is determined on the basis of a thermal load limit of the electric drive. It can be provided that a required torque is not supplied if the power limit has been reached after a predetermined time period. The power limit of the electric drive can be also determined in a generative mode. If an additionally required torque cannot be made available for a predetermined time period with regard to the power reserve, a corresponding signal is provided for the driver via a display means.

Document US 2016/0137185 A1 describes a hybrid vehicle in which an electromotive driving mode or a combustion engine driving mode is planned for the sections of the route lying ahead and adjustments are made based on this with respect to whether the hybrid vehicle is used on a mountain road, in an urban area, or on a highway. In addition, the temperature of a battery of the motor vehicle is taken into account for the determination as to whether switching between the operation of the electric motor and of the internal combustion engine is permitted. The temperature of the battery is also taken into consideration for the determination as to whether an operation of the electric motor is permitted so as to use it as a generator for recovering electric power during braking.

Furthermore, it is known from prior art that in the case when a vehicle is slowing down, an engine that is designed as an electric engine for driving a motor vehicle can be used as a generator and the generated energy can be won back or recuperated, wherein the energy of the motion of the motor vehicle is converted into electric energy. At present, the desire of the driver of the motor vehicle is taken into account based on the current driving state, which is to say for example based on the speed and on transverse acceleration. In addition, the current state of the power train is also taken into account, for example by observing a torque restriction of the electric engine that is used as a generator. The required deceleration torque can be divided for example between the electric engine of the motor vehicle and the operating brake or friction brake.

The predictive efficiency (EPA) assistant offered by Audi AG utilizes in addition also geographical data as well as environmental data, for example in the form of traffic signs, in the recuperation operation of the electric engine. For example, an imminent downhill drive of the motor vehicle can be used for recuperation, or a required slowing down of the motor vehicle at a traffic light or the like can be used. If the driver selects a predetermined driving mode, the recuperation behavior is predetermined in a fixed manner.

As a disadvantage is in this case viewed the fact that an operating strategy of the motor vehicle that is based mostly on the efficiency of the electric engine during recuperation is not always useful. In particular, the case can occur when due to the recuperation operation of the electric engine, it may subsequently not be possible to provide the output that is desired.

SUMMARY

The objective of the present invention is therefore to provide a method and a motor vehicle of the type mentioned in the introduction which makes it possible to provide a particularly great extent flexibility during the recuperation.

According to the method for operating a motor vehicle, at least one electric engine designed for driving a motor vehicle is used for recuperating electric energy. In this case, a trip of the motor vehicle during an imminent time period is taken into consideration. In addition, during the use of at least one electric engine for recuperating electric energy, consideration is given to whether due to a thermal load of at least one electric engine, a reduction of the drive output for of at least one electric engine is to be expected in the imminent time period. When this is the case, the at least one electric engine recuperates during a deceleration of the motor vehicle an amount of electric energy that is less than the amount of electric energy than is expected to be recuperated for the motor vehicle during the deceleration by means of an electric engine. In other words, the maximum is not recuperated when the result of the recuperation is that the electric engine cannot produce in the imminent time period the output that it should provide during that time period. The recuperation strategy is therefore not predetermined in a fixed manner, but instead it is very flexible.

This is based on the realization that it is disadvantageous when a predictable feedback of the electric engine is not taken into account in view of the thermal load and its effect on the recuperation strategy. Such a reduction, in particular an active reduction of the output that can be obtained from the electric engine, is also referred to as derating. Similar derating can be for the most part prevented. As a result, the drive train is utilized in an optimal manner, wherein the preferences of the driver are in particular taken into account. Moreover, in view of the lifespan of the electric engine, it is advantageous when the recuperation strategy is not dependent only on recuperating as much electric energy as possible. This is because a similar recuperation strategy increases the thermal load of the electric engine and this can again have a negative effect on the lifespan of the electric engine.

Furthermore, a recuperation strategy that is optimized only with respect to the efficiency is not useful because the driving operation and the generator operation of the electric engine are viewed as being separated from each other. However, the recuperation can lead to a derating of at least one electric engine, although the driver of the motor vehicle would like to call up the power of the at least one electric engine during the consequent acceleration. In view of the fact that the electric engine has small dimensions with respect to the power and with a corresponding dimensioning of the electric energy storage device of the motor vehicle, this problem may occur already during normal operation. If the drive train has larger dimensions in view of the output of the at least one electric engine and/or of the electric storage device, this problem occurs in particular with the sport type of the driving mode. However, these problems can be avoided at present when the recuperation strategy is taken into account during the time period lying ahead relating to the trip of the motor vehicle.

Maximum efficiency can thus be achieved in this manner during the recuperation while taking into account all the predictive conditions. For example, the thermal behavior of the driver train, a request of the driver, a state of the electric energy storage device of the motor vehicle, as well as geographic data and/or environmental data or environmental parameters in the time period lying ahead can be taken into account. It can happen that by avoiding in an intelligent manner an undesirable great thermal load of at least electric engine, the electric engine will recuperate less electric energy than what would be theoretically possible during the deceleration of the motor vehicle. However, since the electric engine will be spared undesirable treatment during the recuperation of electric energy, this can be compensated for over the lifespan of the electric engine.

It is preferred when during the use of at least one electric engine for recuperation of electric energy, one of the operating modes selected by the driver of the motor vehicle is taken into account. For example, it may be provided that a sport type of driving mode, an efficient driving mode, a comfortable driving mode and the like are made available. If the driver has selected the sport type of driving mode, it can be assumed that in the time period lying ahead, the electric engine will have to deliver more frequently a greater output than would be the case if the driver has selected an efficient driving mode. It can also be that the thermal behavior of the electric engine, which is dependent on the request of the driver, is taken into account for the recuperation strategy. The power consumption and the power output of the users or of the components of the drive train can be thus optimally distributed to the components according to the preference of the driver in the prediction time period. By selecting the driving mode, the driver in particular specifies a preferred weighting of these components or of the drive train user, for example in the form of an electric engine, as an optimization problem.

It has also been shown as advantageous when a driving behavior of a driver of a motor vehicle is taken into account during the recuperation of electric energy of at least one electric engine. If it is for example determined that during the trip of the vehicle so far, which is to say in the preceding time period, the driver frequently accelerates after a curve, or generally in certain situation prefers to call up a particularly high output of the electric engine, the recuperation of electric energy by means of at least one electric engine can be restricted. This is because the output of the electric engine is then available without restrictions for the frequently requested acceleration. It is also possible to use data from past operations describing the habits of the driver relating to his driving behavior, which can be described, evaluated and utilized in this manner.

When the motor vehicle is equipped with at least two electric engines, the distribution of the electric energy to be recuperated from the respective electric engines can be made dependent on the driving behavior of the driver and/or on the selected driving mode. This is the case, for example, when during an acceleration out of a curve, the wheel of the vehicle that is assigned to the outer side of the curve should call up a greater output of the electric engine than the wheel that is assigned by the electric engine to the inner side of the curve. In order to provide the corresponding electric power, the recuperation of the respective electric engine can be controlled or regulated in view of the imminent power requirement.

It is preferred when the at least one environmental parameter is used taken into account for recuperating the electric energy of an electric engine. For example, environmental parameters such as the ambient temperature and/or the intensity of the wind have in influence on the thermal load of the electric engine. Therefore, if environmental parameters of this kind, which have an influence on the thermal load on the electric engine, are taken into account, a particularly far-reaching recuperation of the electric energy can be achieved without sacrificing the output to be supplied to at least one electric engine.

It is preferred when while using at least one electric engine to recuperate the electric energy, the current geographic position of the motor vehicle and/or at least one geographic position of the motor vehicle is taken into consideration. For example, whether the motor vehicle is currently or during a time period lying ahead located on a flat surface or on a more or less steep downward slope plays a role for the recuperation of the output of the power to be expected for the at least one electric engine. With ascending sections, it can be expected that during this time period, a relatively high power output will be expected from at least one electric engine. Therefore, it is possible to ensure that by taking into account the geographical position of the motor vehicle, the at least one electric engine will be able to provide in the time period lying ahead the desired output at all times.

In an analogous manner, it has been found advantageous when during the use of at least one electric engine for recuperating electric energy, at least one characteristic of the distance to be traveled by the motor vehicle is taken into consideration. For example, different accelerations of the motor vehicle may be expected depending on the curve radii and on the nature of the road surface during a certain time period.

It is further also advantageous if at least one state of an electric storage device of the motor vehicle is taken into account when at least one electric engine is used for recuperation of electric energy. This is because the thermal load of the electric energy has a major effect on the extent to which the recovered electric energy can be absorbed and then made available again. By taking into account the state of the electric energy storage device, it is possible to ensure on the one hand that the energy that has been recovered can be in fact received. In addition, avoidance of an undesirable load on the energy storage device will on the other hand also result in a particularly long lifespan of the electric energy storage device.

An operating brake of the motor vehicle can be used to decelerate the motor vehicle. The use of such an operating brake or friction brake of the motor vehicle makes it particularly easy to ensure that at least one electric engine will recover an amount of the electric energy with a reduced amount compared to the maximum amount of the electric energy that can be recovered, while the required deceleration is still achieved.

Additionally or alternatively, a recuperation torque can be distributed unequally to a first electric engine and to a second electric engine with deceleration of the motor vehicle depending on which output of the respective electric engine is to be provided during the time period when the motor vehicle is driven. It can also be provided that for example, the electric energy is recuperated with less intensity for the electric engine which should have next a particularly strong large driving power available to it, which is to say in the time period directly ahead. On the other hand, the electric engine for which it will not be required to provide driving power in this time period, or for which it will be required only to a lesser degree, a reduction of the amount of electric energy to be recovered will also be required to a lesser degree. This means that for example two electric engines can be used particularly efficiently for recuperation as well as for driving the motor vehicle.

In this case, it has been found advantageous when at least two electric engines are used, the one which that has a lower efficiency with respect to recuperation of electric energy is impacted by a greater recuperation torque. This is because if only the electric engine which has a higher efficiency is constantly impacted with a higher recuperation torque, it can then occur that precisely this electric engine will not be able to supply driving power or supply it only to a lesser extent to the motor vehicle during the period of time lying ahead. This can be prevented in the present case. Accordingly, efficient utilization of the at least two electric engines is provided with regard to power output also in this respect.

Finally, it has been found to be advantageous when the heat generated by at least one electric engine in order to heat at least one electric energy storage device of the motor vehicle of at least one electric engine is used during the recuperation of electric energy. In particular with a cold start of the motor vehicle, the recuperation strategy can be also adapted in such a way that the motor vehicle will be heated up particularly quickly. The electric energy storage device can be provided particularly well in the time period lying ahead with electric energy which is used to drive the vehicle.

Also in this case it is preferred when among the at least two electric engines, the electric engine that is preferably impacted with the greater recuperation torque is the one which achieves efficiency to a smaller extent. The heating up of the electric storage device is then carried out particularly quickly.

The motor vehicle according to the invention is provided with at least one electric engines designed to recuperate electric energy for driving the motor vehicle. A control device of the motor vehicle is designed to control at least one electric engine so that it can be used for recuperation of electric energy. The control device is thus designed to take into account a trip of the motor vehicle during a time period lying ahead. The control device is in addition designed to take into account during the use of the at least one electric engine for recuperating electric energy the fact as to whether due to the thermal load of at least one electric engine during the time period lying ahead, as a result of a thermal load of at least one electric engine, a reduction of the driving output that can be obtained is to be expected from at least one of the electric engine during the time period lying ahead. In addition, the control device is also designed to control at least one electric engine in such a way that at least one electric engine recuperates during the deceleration of the motor vehicle an amount of electric energy that is smaller than the amount of electric energy that can be recuperated during the deceleration by means of at least one electric engine. Such a motor vehicle makes it possible to achieve a particularly great extent of flexibility during the recuperation of electric energy.

The control device of the motor vehicle is equipped with a processor apparatus which is adapted to carry out an embodiment of the method according to the invention. The processor can be in this case provided with at least one microprocessor and/or at least one microcontroller. In addition, the processor apparatus can be equipped with a programming code, which is designed to carry out the method according to the invention of the embodiment with the processing apparatus. The programming code can be stored in a data storage device of the processor apparatus.

To the invention also belong further developments of the motor vehicle, which are provided with features such as those that have been already described in connection with further development of the method. For this reason, the corresponding further development of the invention are not described here one more time.

BRIEF DESCRIPTION OF THE DRAWINGS

An embodiment of the invention will be described next. For this purpose, FIG. 1 schematically illustrates a motor vehicle which is equipped with an electric engine designed to recuperate electric energy.

The embodiments described below are preferred embodiments of the invention. In the embodiments, the described components represent individual features of the invention, which are independent of each other and which also form the invention independently of each other and thus also individually or in other combinations than those that are indicated as components of the invention. Furthermore, the described embodiments can be also complemented by other, already described features of the invention.

DETAILED DESCRIPTION OF THE DRAWINGS

The motor vehicle 10, which is shown schematically in FIG. 1, is provided with a first electric engine 12 and with a second electric engine 14. The electric engines 12, 14 are designed for driving the motor vehicle 10. For example, the first electric engine 12 can be associated with a rear left wheel 16 of the motor vehicle and the second electric engine 14 can be associated with a rear right wheel of the motor vehicle 10.

Both electric engines can be also used for recuperation of electric energy. In this case, the electric engines 12, 14 are used as generators which supply electric energy for example to an electric energy storage device 18 of the motor vehicle 10. A recuperation operation of the electric engines 12, 14 is predetermined by the control device 20. The control device 10 takes in this case into account a trip of the motor vehicle 10 during a time period lying ahead. For example, the motor vehicle 10 can travel during the time period lying ahead along the section 22 which is schematically illustrated in the FIGURE.

In the present case, the control device 20 will take into account whether due to a thermal load of the electric devices 12, 14, a reduction of the power that can be output during the time period can be expected. When this is the case, at least one of the electric engines 12, 14 will recuperate during the deceleration of the motor vehicle an amount of electric energy that is less than an energy amount that can be recuperated during the deceleration by the electric engines 12, 14. In the present case, the thermal behaviors of the drive components, in particular in the form of the electric engines 12, 14 but also of the electric storage device 18, are taken into account during the recuperation.

In addition, the driver of the motor vehicle can select a driving mode of the motor vehicle 10. via a user interface 24, which is shown only schematically in the present case, for example with a touch screen and/or with a touchpad and/or with a switch. This driving mode is also taken into account for the recuperation strategy, which the control apparatus 20 converts into energy during the activation of the electric engines 12, 14 for recuperation.

Moreover, the control apparatus 20 takes into account the previous driving conductor of the driver of the motor vehicle 10. Furthermore, the motor vehicle 10 is equipped with a navigation system 26, by means of which the geographic position of the motor vehicle 10 can be determined. The navigation system 26 can provide further data for the control device 20, which are relevant to the route 22 to be covered in the time period lying ahead. So for example, a radius of curves 28 of the distance 22, a distance section 30 of the route 22 with a downward slope, or upward inclination or similar factors are taken into account in a predicative manner by the control apparatus 20.

The calculation of the magnitude of the recuperation torque of the respective electric engine 12, 14 and of its distribution when there are several electric engines 12, 14, is carried out in the present case with a prediction for the entire use of the drive train in a prediction time period, which is to say for the time period lying ahead. In particular, this prediction time period can be the entire travel of the motor vehicle 10, from a starting location to a target location. The recuperation operation determined by the control device 20 therefore is not based only on the deceleration effect of the drive train. Instead, the entire power potential and the lifespan potential of the drive train are predicted and considered. All users or all usage functions of the drive train are in this case considered. To these usage functions belong for example the drive which is provided by the electric engines 12, 14 and the distribution of the torque to both electric engines 12, 14.

In the time period lying ahead or in the prediction time period, in particular the interplay between all of the users of the drive train is optimized with the integration of a drive train mode, including for example environmental data or environmental parameters, positional data or data provided for the geographical position of the motor vehicle, and past driver data. By means of the drive train model, the control device can for example estimate whether a reduction of the of the power that can be delivered by the electric engine 12, 14 can be expected during the acceleration out of one of the curves 28 on the route 22 as a result of a thermal load of at least one of the electric engines 12, 14. This kind of derating is also influenced by the environmental parameters such as for example the ambient temperature, the radii of the curves, while the upward slopes and downward slopes of the route 22, and the topographic height will also play a role.

The potential of the power train can be utilized in an optimal manner by taking into account these parameters. In this case, the preference of the driver is taken into account so that the driving mode selected by the driver is evaluated by the control device 20. In addition, restrictions on the maximum electromotive output of the electric engines 12, 14 are taken into account in view of the lifespan of the drive train.

In the present case, for example in the case of recuperation with an imminent derating, which is to say with a reduction of the output due to thermal load of one of the electric engines 12, 13, recuperation is redistributed early on to one of the electric engines 12, 14. In addition, the recuperation can be restricted when a boosting operation is desired, which is to say that when a strong acceleration of the motor vehicle 10 that is supported by the electric engines 12, 14 is desired in the shortest possible time. On the other hand, if the control device 20 should only take into account for the purposes of the recuperation strategy the fact that the electric engines 12, 14 should recover the maximum energy amount, this would lead to a derating of the electric engines 12, 14. Accordingly, no such acceleration of the motor vehicle 10 could then take place.

The drive train does not need to be provided with both electric engines 12, 14 as shown in the present example. In particular, with a drive train that is provided with only one electric engine 12, the proportion of the deceleration that is not caused by the electric engine 12, is caused by an operating brake shown schematically in the present case.

As users of the drive train, in particular the recuperation, the drive or the propulsion, and the transverse dynamics of the torque distribution (which is to say the so-called torque vectoring) to both electric engines 12, 14 are taken into consideration. The decision making that is used to distinguish between a greatest possible range of the motor vehicle 10 and thus also a possibly largest recuperation achievable by the electric engines 12, 14, or a greater dynamic when traveling through the route 22 is based additionally also on the parallel predictive model of the drive train, or of the drive train, and on the actual driving behavior of the driver.

For example, the habits of the driver, such as acceleration after the curves 28 and similar data obtained from the previous behavior of the driver are taken into consideration. When the driver for example in certain situations frequently wants to accelerate or boost the power, the recuperation of the electric engines 12, 14 is restricted, or the recuperation torques are distributed differently to the electric engines 12, 14. In addition, the positional data or the geographical positions of the motor vehicle 10 are also fed in as data to be indicated, as well as topographic data, and the travel on the section 22 is taken into account in a predictive manner.

When the at least two electric engines are available as was shown in the example above, then for example the electric engine 12, which has a poorer efficiency, can be used for recuperation when the other electric engine is then subsequently used for traction during acceleration.

The optimization criteria are in particular the sum of the total requirements of the driver, the efficiency of the drive train and the predictive output capability of the drive train. In addition, the model of the drive train also plays a role, such as for example the cooling conduct of the engines 12, 14 as well as that of the energy storage device 18. The predicted thermal conduct of the driver components, including that of the electric energy storage device 18, is therefore taken into consideration. The result is that output limitations are thus avoided in this manner, which in turn leads to an optimal utilization of the drive train. Moreover, conservation of the energy of the battery or of the electric storage device 18 is also taken into consideration.

The heating strategy of the drive train can also lead to an adjustment of the recuperation behavior of the motor vehicle 10, in particular after a cold start, which is to say with a cold start of the motor vehicle 10. For example, the electric engines 12, 14 may be deliberately used with a poorer efficiency for recuperation in order to heat the electric energy storage device particularly quickly.

However, the driving mode that has been selected by the driver is taken into account also in this case. For example, the heating of the electric energy storage device 18 is conducted while an efficient driving mode is selected which is slower than the sport type of driving mode. This is because in the sport type of driving mode, the electric energy storage device 18 should provide a particularly large amount of electric energy for the electric engines 12 14 very quickly.

The motor vehicle 10 can be in particular an electric motor vehicle or a hybrid vehicle. The motor vehicle 10 can be in addition provided with two other electric engines 34, 36. Accordingly, the electric engine 34 can be assigned to a front left wheel 38 and the electric engine 36 can be assigned to a front right wheel of the motor vehicle 10. The same principles that were mentioned in connection with the electric engines 12, 14 can be applied in an analogous manner also to the control of these electric engines 34, 36 by means of the control device 20.

Overall, the example shows how the invention makes it possible to ensure that a recuperation that is appropriate for a given situation can be achieved while taking into consideration the requests of the driver and a predicted drive train potential and lifespan potential.

The invention claimed is:

1. A method for operating a motor vehicle, wherein during a trip of the motor vehicle in a time period lying ahead, at least one electric engine is used for recuperating electric energy, the method comprising:
   determining a current driving mode of the vehicle, said driving mode selected by the driver from among a plurality of selectable driving modes, each of the plurality of selectable driving modes prescribing a different optimization weighting of factors taken into account during usage of the at least one electric engine for driving and for recuperating electric energy, and power consumption and generation by components of the motor vehicle;
   based on a determination of the current driving mode of the vehicle and an optimization weighting associated with the current driving mode, determining an anticipated future power need of the vehicle;
   recuperating an amount of electric energy which is smaller than the amount of electric energy which can be recuperated during a deceleration by at least one electric engine, wherein during the usage of the at least one electric engine for recuperating electric energy, the driving mode selected by the driver of the motor vehicle and the anticipated future power need of the vehicle are taken into account and at least one of a thermal load of the at least one electric engine in the time period lying ahead and an expected reduction of the drive output that can be provided to the motor vehicle by at least one electric engine is taken into account.

2. The method according to claim 1, wherein during the use of at least one electric engine for recuperating the electric energy, a driving conduct selected by the driver of the motor vehicle is taken into account.

3. The method according to claim 1, wherein during the use of at least one electric engine for recuperating the electric energy, at least one environmental parameter is taken into account.

4. The method according to claim 1, wherein during the use of at least one electric engine for recuperating the electric energy, a current geographical position of the motor vehicle and at least one geographical position of the motor vehicle during the time period lying ahead and a characteristic of the route to be traveled on in the time period laying ahead by the motor vehicle is taken into account.

5. The method according to claim 1, wherein during the use of at least one electric engine for recuperating the electric energy, a state of an electric energy storage device of the motor vehicle is taken into account.

6. The method according to claim 1, wherein an operating brake is used for braking the motor vehicle.

7. The method according to claim 1, wherein in order to decelerate the motor vehicle, a recuperation torque is unevenly distributed to a first electric engine and to a second electric engine depending on an output of the first and second electric engines during the time period lying ahead.

8. The method according to claim 1, wherein among at least two electric engines, at least one of the at least two electric engines is chosen to receive a greater recuperation torque, wherein the at least one of the at least two electric engines has a lower efficiency with regard to recuperation of electric energy.

9. The method according to claim 1, wherein heat generated by the at least one electric engine during recuperation of the electric energy is used to heat up at least one electric storage device of the motor vehicle.

10. A motor vehicle, comprising:
    at least one electric engine designed to drive the motor vehicle, which can be used for recuperating electric energy, and which is provided with a control device for controlling at least one electric engine for using the same for recuperating the electric energy, wherein the control device is designed to take into account a travel of motor vehicle during a time period lying ahead, wherein the control device is designed to take into account a driving mode selected by the driver of the motor vehicle, wherein the control device is designed to take into account during the use of at least one electric engine for recuperation of electric energy at least one of a thermal load of at least one electric engine in the time period lying ahead and an expected reduction of the drive output of the one electric engine that can be obtained for the motor vehicle, and therefore to control the at least one electric engine during a deceleration of the motor vehicle so that an amount of the electric energy recuperated by at least one electric engine during a deceleration of the motor vehicle is smaller than the amount of electric energy that can be recuperated during the deceleration by the at least one electric engine,
    wherein the driving mode selected by the driver is one of a plurality of selectable driving modes, each of which prescribes a different optimization weighting of:
    factors taken into account during usage of the at least one electric engine for driving and for recuperating electric energy; and
    power consumption and generation by components of the motor vehicle; and
    wherein taking into account the driving mode selected by the driver of the motor vehicle comprises determining, based on the driving mode selected by the driver of the motor vehicle and an optimization weighting associated with the driving mode, an anticipated future power need of the motor vehicle.

* * * * *